United States Patent [19]

Johnson

[11] 4,426,829
[45] Jan. 24, 1984

[54] GRASS AND DITCH MOWER

[76] Inventor: Richard W. Johnson, Rte. 1, Box 450D, Belle Rose, La. 70341

[21] Appl. No.: 402,207

[22] Filed: Jul. 26, 1982

[51] Int. Cl.³ .............................................. A01D 35/28
[52] U.S. Cl. .................................... 56/15.5; 56/15.8; 56/208; 56/DIG. 10; 56/15.3; 56/10.4
[58] Field of Search ................ 56/10.2, 10.4, 10.7, 56/15.2, 15.3, 15.5, 15.7, 15.8, DIG. 10, 328 R, 208

[56] References Cited

U.S. PATENT DOCUMENTS

| | | | |
|---|---|---|---|
| 2,588,004 | 3/1952 | Holmes | 56/15.2 |
| 3,087,296 | 4/1963 | Cowles | 56/295 |
| 3,257,789 | 6/1966 | Carlson | 56/10.4 |
| 3,337,071 | 8/1967 | Clark | 56/328 R |
| 3,545,184 | 12/1970 | Liepold et al. | 56/10.4 |
| 3,552,107 | 1/1971 | Swift | 56/328 R |
| 3,949,539 | 4/1976 | Cartner | 56/15.5 |

FOREIGN PATENT DOCUMENTS

| | | | |
|---|---|---|---|
| 2155856 | of 1973 | Fed. Rep. of Germany | 56/15.5 |
| 1782299 | of 1975 | Fed. Rep. of Germany | 56/15.3 |

*Primary Examiner*—Gene Mancene
*Assistant Examiner*—David L. Tarnoff
*Attorney, Agent, or Firm*—William D. Kiesel

[57] ABSTRACT

A grass and ditch mower is provided having a novel floating cutting deck mounted to a novel extension arm assembly.

1 Claim, 13 Drawing Figures

FIGURE 1

GRASS AND DITCH MOWER

BACKGROUND OF THE INVENTION

1. Field of the Invention

This invention relates in general to mowers, and more particularly to mowers having its cutting deck mounted on an extendable arm.

2. Prior Art

At present, mowers have been designed in general either for cutting principally lawn grass or for cutting large bushes and brush along roadways and ditches, but because of structural difficulties not both.

Examples of such bush and brush mowers can be seen in Eaton U.S. Pat. No. 3,559,385 issued Feb. 2, 1971 and entitled "Slopemower Apparatus For Highway and Railroad Rights-of-Way" and in Cowles U.S. Pat. No. 3,087,296 issued Apr. 30, 1963 and entitled "Brush Cutter." Also typical of models actually manufactured is The Boom Axe manufactured by Terrian King Corporation, Sequin, Tex.

Unfortunately, these present mowers are restricted in the functions which they can perform. Furthermore, those mowers capable of cutting small bushes and brush are quite heavy, bulky and tall, in order to achieve flexibility in positioning the cutting deck on steep grades to reach the bushes and brush and to follow the contour of the surface being cut. Also, these mowers do not have the ability to obtain a fine cut that would be expected of a conventional lawn mower.

Another difficulty of the prior art equipment has been the danger of it tipping over unless an extremely heavy base is used, due to the high center of gravity of the cutting member assembly. The prior art design also places large tension on the hydraulic cylinder resulting in shorter wear time and increased play in the telescoping boom arms.

SUMMARY OF THE INVENTION

Therefore, it is an object of this invention to provide a mower having both lawn cutting, as well as, small bushes and brush cutting abilities under and over obstacles.

Another object of this invention is to provide a multi-purpose mower which is light in weight, and having a lower center of gravity than other extension arm mowers.

Still another object is to provide a mower having an improved cutting deck attached to an extension arm.

A further object is to provide a mower having a more versatile extension arm for exact positioning of the mower cutting deck.

Other objects and advantages of this invention shall become apparent from the ensuing descriptions of the invention.

Accordingly, a grass and ditch mower is disclosed having a telescoping boom assembly mounted on a power driven movable carriage to which is pivotly mounted at the extending end of the boom assembly, a cutting deck assembly, wherein the boom assembly comprises two concentric tubes positioned to telescope into a third tube, a first hydraulic cylinder attached to the outside of the third tube and the extending end of the outer tube of the concentric tubes, a second hydraulic cylinder attached at the opposite end of the outer tube and the inner end of the other concentric tube, a cutting deck attaching assembly connecting the cutting deck assembly to the inner concentric tube.

BRIEF DESCRIPTION OF THE DRAWINGS

FIG. 1 is a three-dimensional side view of a preferred embodiment of the grass and ditch mower of this invention.

PREFERRED EMBODIMENTS OF THE INVENTION

Figure 1:
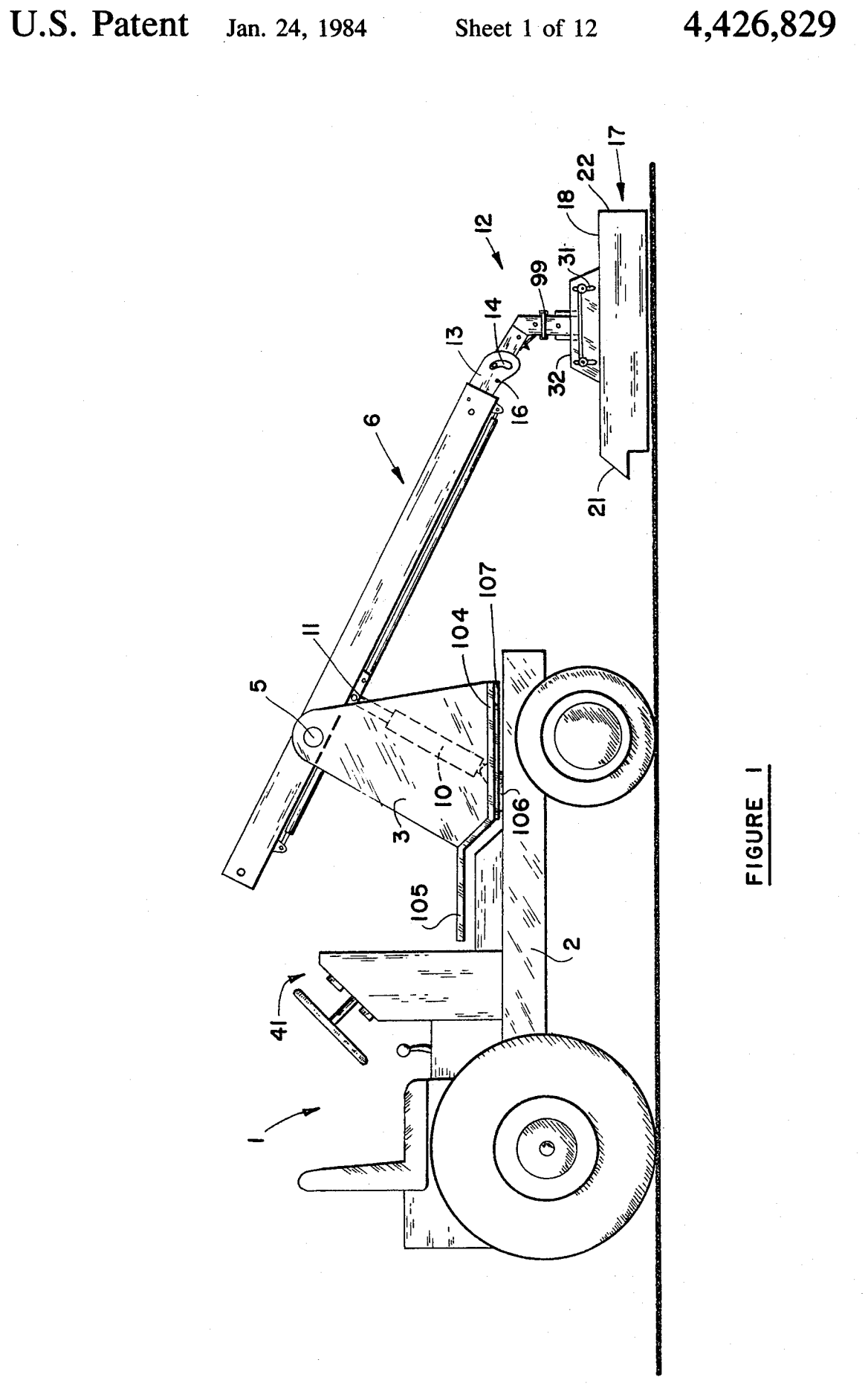
Figure 2:
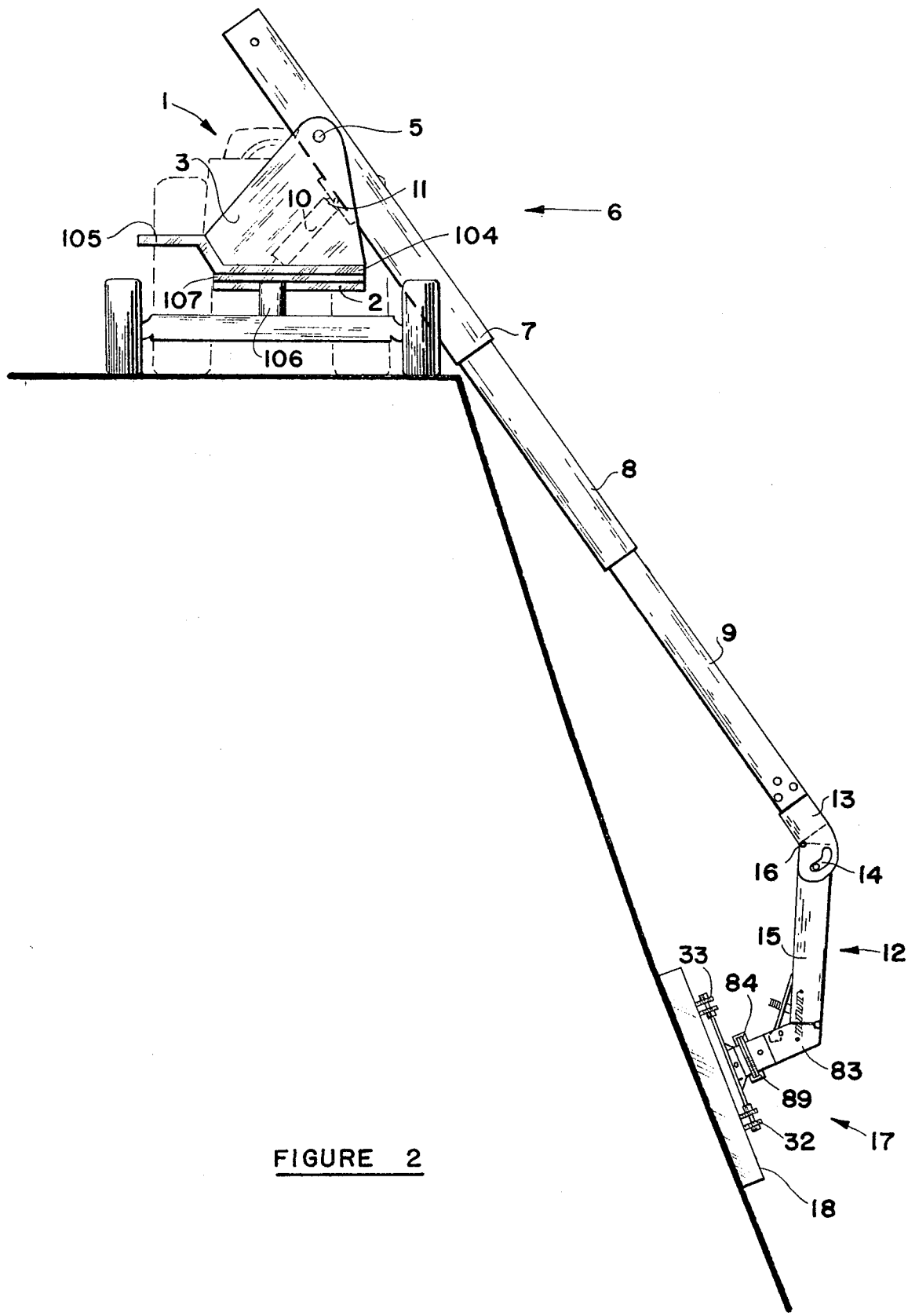
FIG. 2 is a three-dimensional frontal view of a preferred embodiment of the grass and ditch mower of this invention positioned to cut on a steep ditch side.
Figure 3:
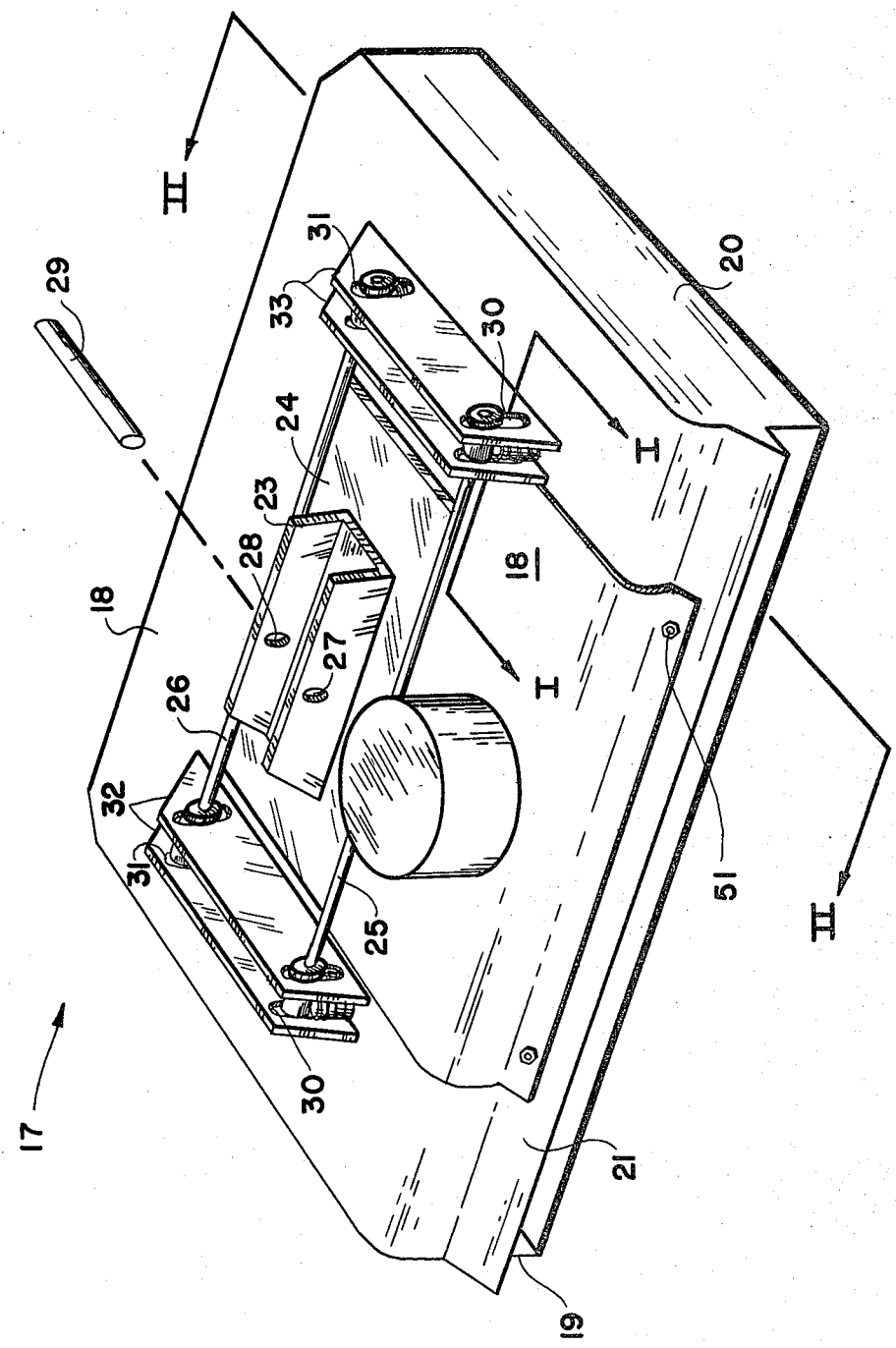
FIG. 3 is a three-dimensional view of a preferred embodiment of the cutting deck used with the mower of this invention.

Turning now to FIGS. 1 and 2, a motor driven carriage, denoted generally by the numeral 1, is illustrated having a front platform 2 on which is vertically mounted parallel, separated boom support plates 3 to which, by pin 5, is pivotly mounted boom assembly 6. Plates 3 are perpendicularly attached to metal plate 104 having in a preferred embodiment a counterweight platform 105 extending outward from the rear of plates 3. Plate 104 rotates on axle 106 attached to body platform 2. In a preferred embodiment friction pad 107 constructed from self-lubricating materials is placed between plate 104 and body platform 2 as shown.

Boom assembly 6 comprises three concentric tubes 7, 8 and 9 which are attached to one another in telescoping fashion as explained below which are pivotly positioned about pin 5 by hydraulic cylinder 10 pivotly attached at one end to plate 104 and pivotly attached at its extending arm 11 to the exterior of outer tube 7.

Boom assembly 6 also comprises cutting deck attaching assembly 12 having boom attaching members 13 with arcuate shaped opening 14 that as explained below allows cutting deck attaching member 15 to pivot about pin 16.

Finally, mower 1 comprises cutting deck assembly 17, illustrated in FIGS. 1–6, having an upper deck plate 18 with conventional side, front and rear panels 19, 20, 21 and 22 as shown. Cutting deck assembly 17 is also provided with a piece of channel iron 23 welded or otherwise permanently fixed to a metal plate 24 mounted between parallel rods 25 and 26. Channel iron 23 is provided with aligned openings 27 and 28, as shown, for attaching one end of cutting deck attaching assembly 12 by pin 29.

Rods 25 and 26 extend past plate 24 and into a housing assembly comprising parallel, aligned pairs of slots 30 and 31 respectively. Slots 30 and 31 are located in parallel floating assembly plate pairs 32 and 33 that are fixedly attached perpendicularly to upper deck plate 18.

Figure 4:
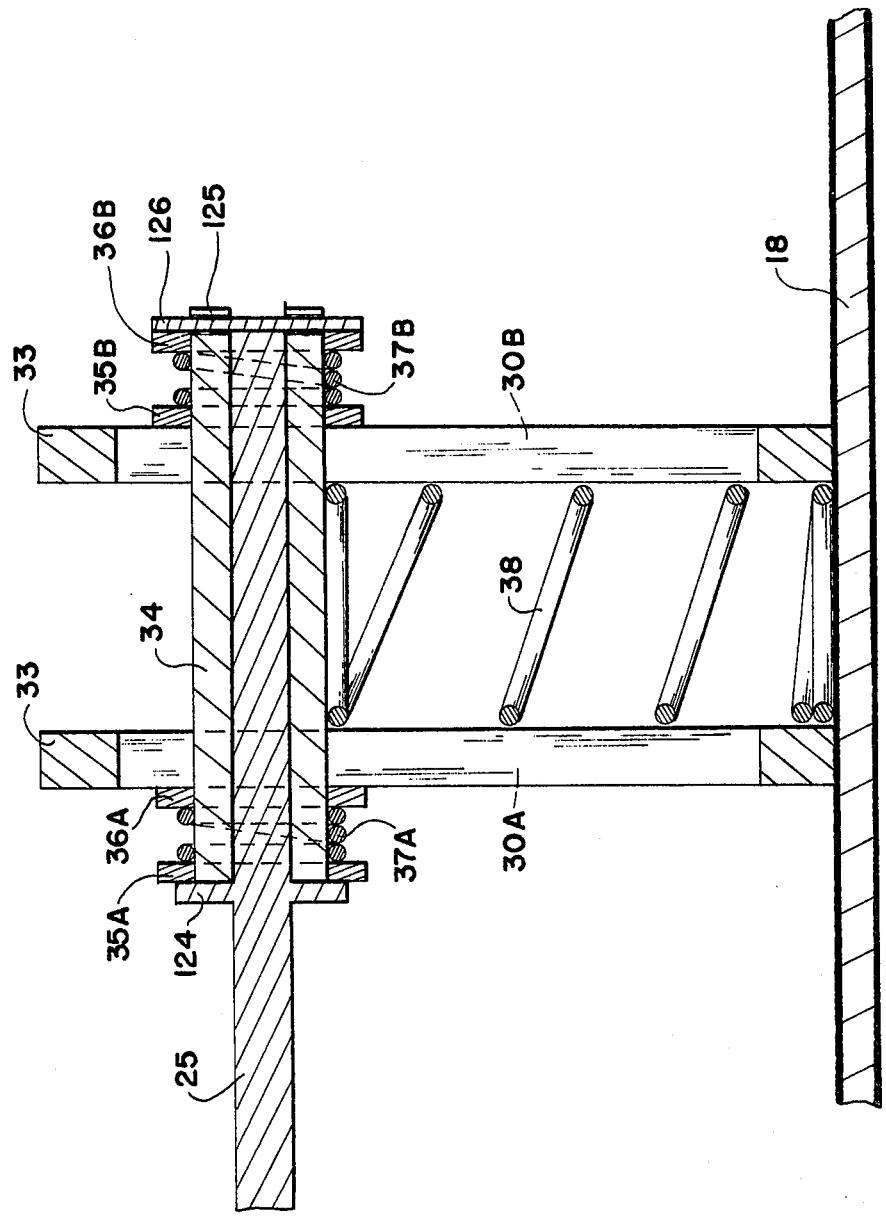
FIG. 4 is a cross-sectional view of mower deck floating assembly taken along lines I—I of FIG. 3.

Turning now to FIG. 4, it is seen that rod 25 having shoulder section 124 is held in slots 30A and 30B by a tubular sleeve 34 fitting through slots 30A and 30B and held in position at its opposite end 125 by pin 126 thereby positioning pairs of washers 35A, 36A and 35B, 36B separated by springs 37A, 37B as shown. The vertical position of rod 25 is maintained by spring 38 fitted between plates 33 having one end abutting against plate 18 and its other end abutting against sleeve 34. Rod 26 is held in slots 31 in similar fashion. This arrangment allows cutting deck assembly 17 to move angularly along the contour of the land in a "floating" manner.

Figure 5:
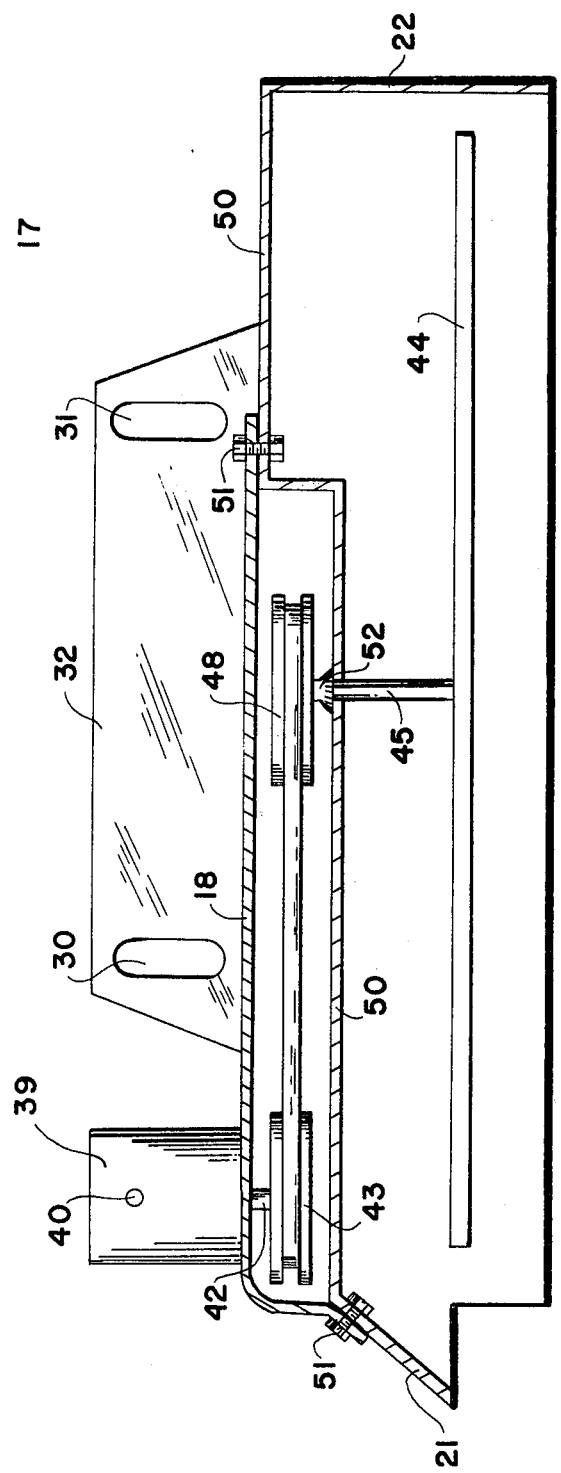
FIG. 5 is a cross-sectional view of the mower deck taken along lines II—II of FIG. 3.
Figure 6:
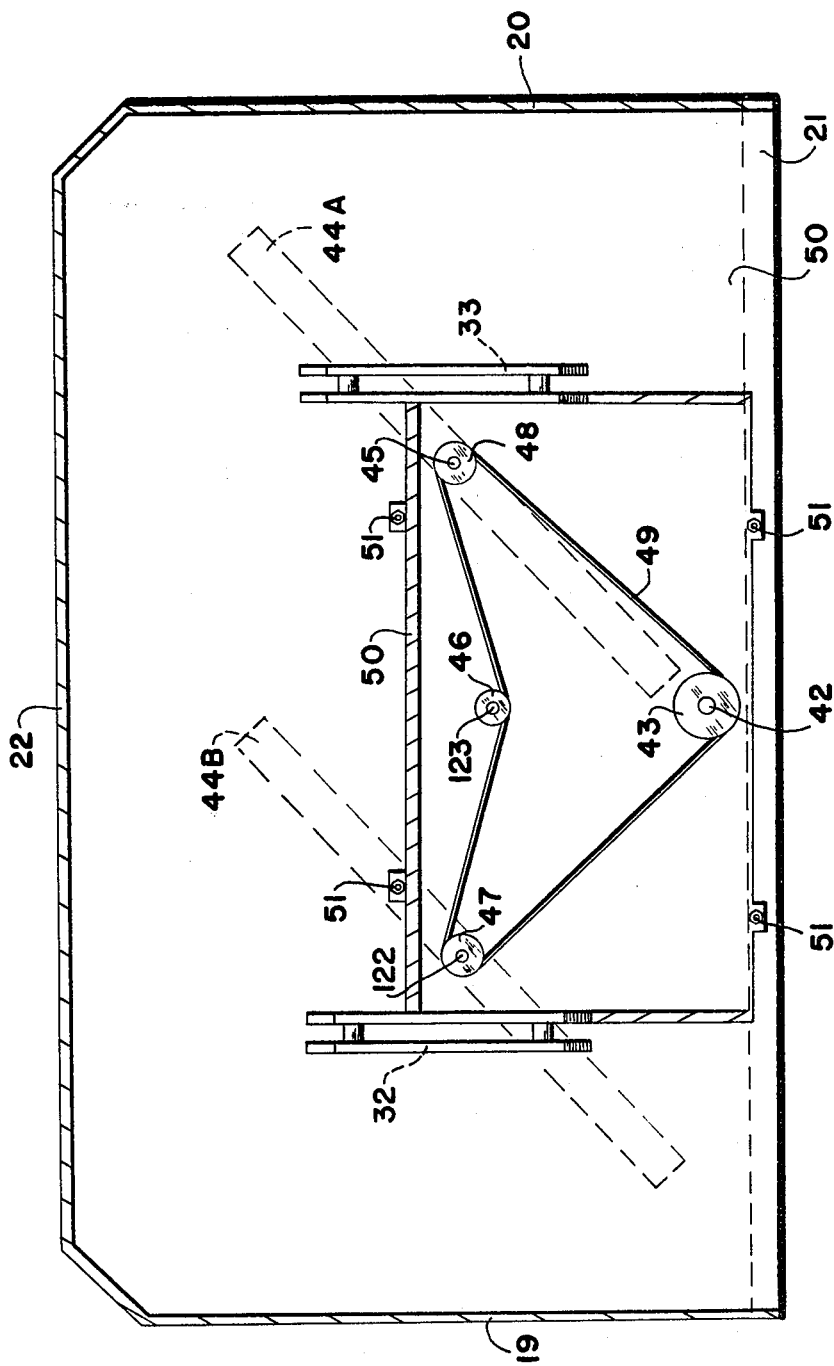
FIG. 6 is a three-dimensional top view of the mower cutting deck with top deck removed.

The cutting assembly as shown in FIGS. 5 and 6 comprises hydraulic motor 39 having hydraulic hose connection 40 that extends to the control panel 41 at the operator's position. Motor 39 has a rotating shaft 42 with a pulley 43 at its extending end. Blade 44A has shaft 45 with a pulley 48 attached to its end and vertically aligned by spindle assembly 52 with motor pulley 43. In like manner, blade 44B has shaft 122 with pulley 47 attached to its end and vertically aligned with pully 43. Tensioning pulley 46 on shaft 123 is positioned so that drive belt 49 is maintained under proper tension in a conventional manner. In a preferred embodiment, a shielding plate 50 is bolted by bolts 51 to top deck plate 18 as shown to protect the pulleys and belt 49 from damages from flying branches, etc.

Figure 7:
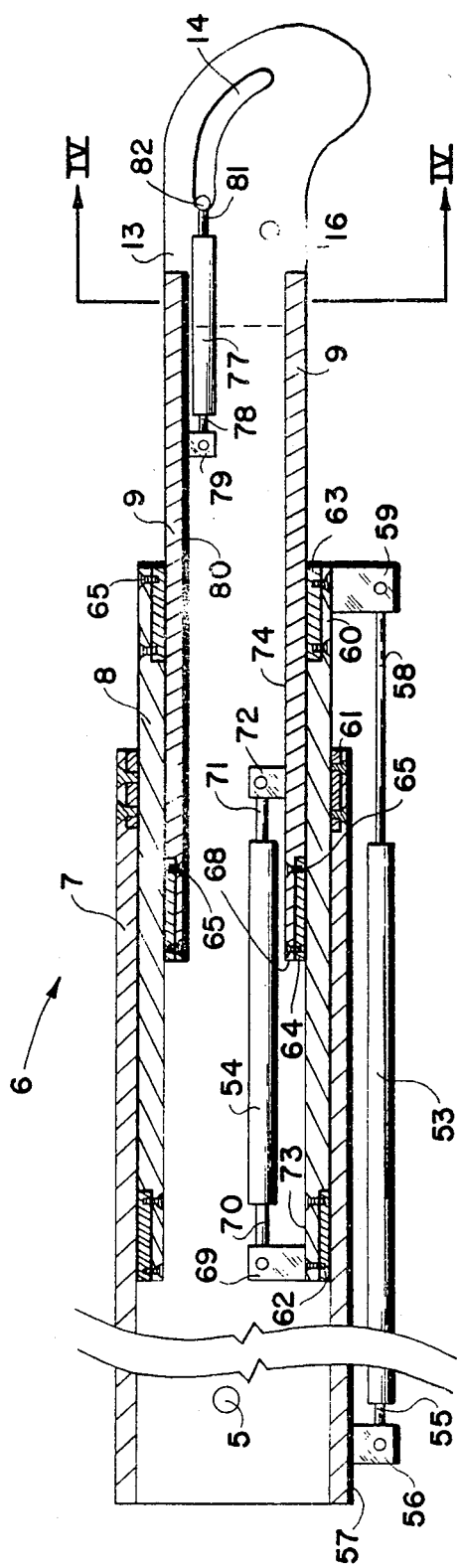
FIG. 7 is a cross-sectional view of a preferred embodiment of the boom assembly in a partially contracted position.
Figure 10:
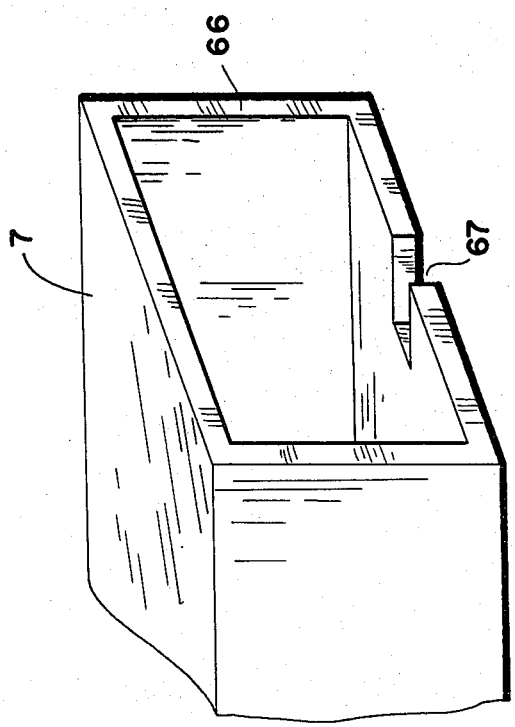
FIG. 10 is an three dimensional end view of the outer tubular member of the boom assembly.

FIG. 7 and 10 illustrate a preferred embodiment of boom assembly 6. Turning particularly to FIGS. 1 and 7, boom assembly tubes 7, 8 and 9 are extended and contracted by hydraulic cylinders 53 and 54. Boom cylinder 53 is attached at one end 55 in a conventional manner to ear member 56 protruding from outer tube surface 57 as shown. The piston rod end 58 is attached to ear member 59 protruding from middle tube surface 60. Thus, as piston end 58 is horizontally moved so is middle tube 8 relative outer tube 7.

In a preferred embodiment, boom tubes 7, 8 and 9 are provided with sections of self-lubricating plates 61, 62, 63, 64 to eliminate the use of roller bearings and to reduce the play in the boom assembly tubes when they are extended. Plates 61, 62, 63, 64 are held in position by recessed screws 65. In a more preferred embodiment, cylinders 53 and 54 are positioned so that when boom tubes 8 and 9 are fully extended a portion of tube 9 remains inside tube 8 and a portion of tube 8 remains inside tube 7. To achieve full contraction, the end 66 contains notch 67 to receive ear member 59. In a like manner, end 68 of inner tube 9 is notched to receive ear member 69.

Cylinder 54 is attached at one end 70 to ear member 69 and at its piston rod end 71 to ear member 72, which ear members are protruding from middle tube surface 73 and inner tube surface 74, respectively, as shown.

Figure 11:
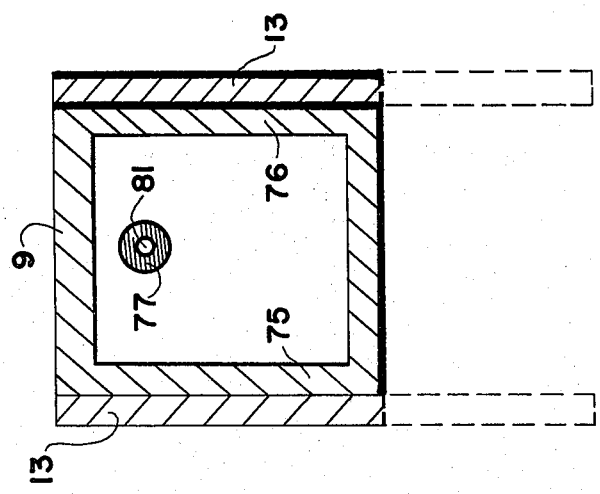
FIG. 11 is a cross-sectional view taken along lines IV—IV of FIG. 7.

As shown in FIGS. 1, 7 and 11 boom attaching members 13 are welded or otherwise fixedly attached to opposite walls 75 and 76 of inner tube 9 to form a channel for cutting deck attaching member 15 to be positioned. Hydraulic cylinder 77 is attached at one end 78 to ear member 79 protruding from inner tube surface 80 and at its piston rod end 81 to pin 82 that fits through arcuate shaped openings 14 of boom attaching members 13.

Figure 7A:
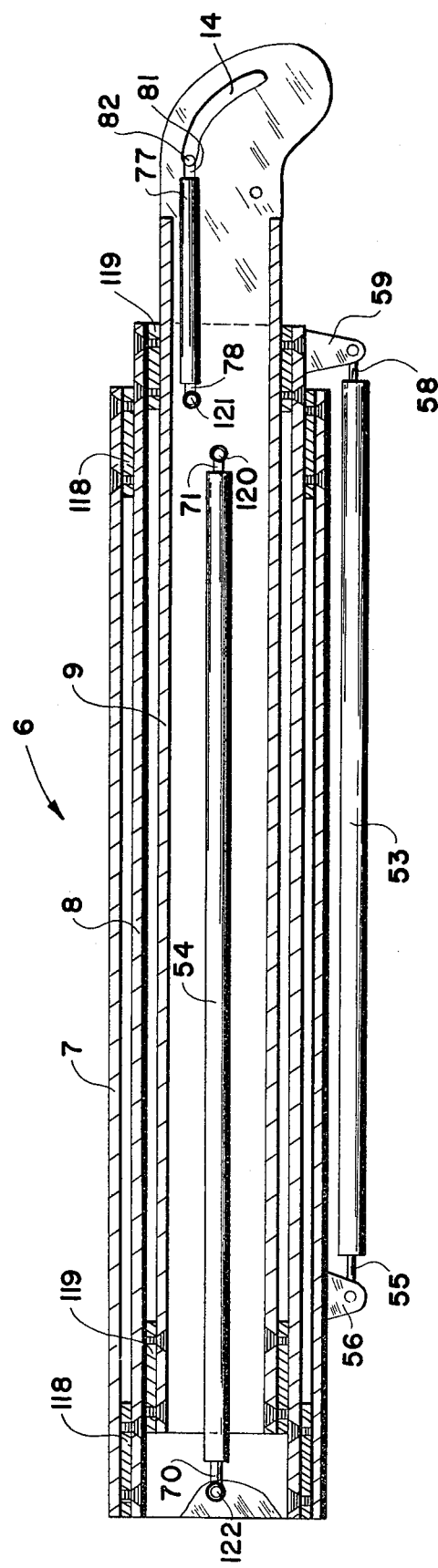
FIG. 7A is a cross-sectional view of an alternate preferred embodiment of the boom assembly in a partially contracted position.

In the alternate preferred embodiment illustrated in FIG. 7A tubes 7, 8 and 9 are separated from one another by self-lubricating plates 118 and 119 as shown, thus substantially reducing friction during the telescoping of the tubes. Also, in this embodiment pins 120 and 121 which pass through hydraulic cylinder ends 71 and 78, respectively, go only through inner tube 9 to anchor the hydraulic cylinder ends. Pin 122 which anchors cylinder end 70 passes only through middle tube 8.

Figure 8:
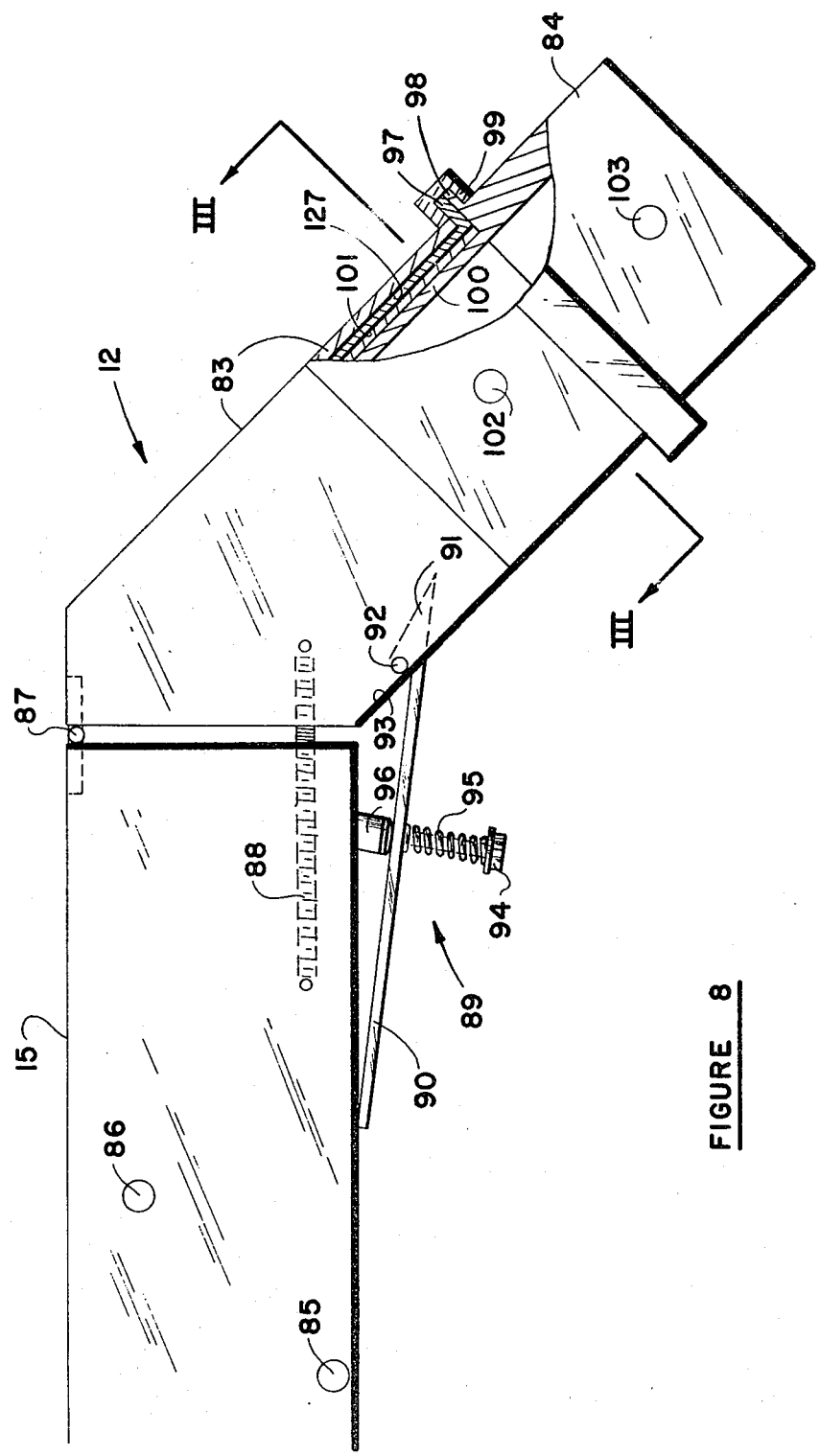
FIG. 8 is a partial three-dimensional view of a preferred embodiment of the cutting deck attaching assembly which is pivotly attachable to the boom assembly of FIG. 7.

Assembly 12 as seen in FIG. 8 comprises member 15, elbow section 83 and connector member 84. Member 15 is provided with aligned openings 85 through which pin 16 can pass to allow assembly 12 to pivot. It is also provided with a second pair of aligned openings 86 through which pin 82 protrudes. In this manner as piston rod end 81 is extended member 15 is moved downward in an arc defined by opening 14. Elbow section 83 is attached to member 15 by hinge 87 and in a preferred embodiment held in position by spring 88 attached at one end to member 15 and at its opposite end to elbow section 83. In a most preferred embodiment latching assembly 89 is also provided. In this embodiment assembly 89 comprises a metal leaf spring 90 having a catch 91 fittable about rod 92 fixedly attached to elbow member wall surface 93. Leaf spring 90 is held in position by screw 94 and coil spring 95. Screw 94 can be screwed into threaded nut 96 to adjust the pressure exerted by spring 95 against leaf spring 90. This feature protects against damage to boom assembly 6 resulting from the sudden upward movement by cutting deck assembly 17 during operation. In this event, catch 91 is released by the upward force from rod 92 and elbow member 83 is allowed to pivot upward about hinge 87. Elbow member 83 is then forced back down by spring 88 to again lock catch 91 about rod 92 after cutting deck assembly has past the object.

Elbow member 83 has attached thereto adaptor tube 127 having lip 97 which abutts lip 98 connector member 84. A snap-on swivel coupling 99 is positioned about lip 97 and 98 to hold members 83 and 84 together. In addition, member 84 has an end 100 that extends into pressed bushing 101 between end 100 and adaptor tube 127 as shown. To further secure members 83 and 84, pin 102 extends through aligned openings in member 83, bushing 101, adaptor tube 127 and inside member end 100. Member 84 is also provided with aligned openings 103 through which pin 29 extends to connect member 84 to channel iron 23.

Figure 8A:
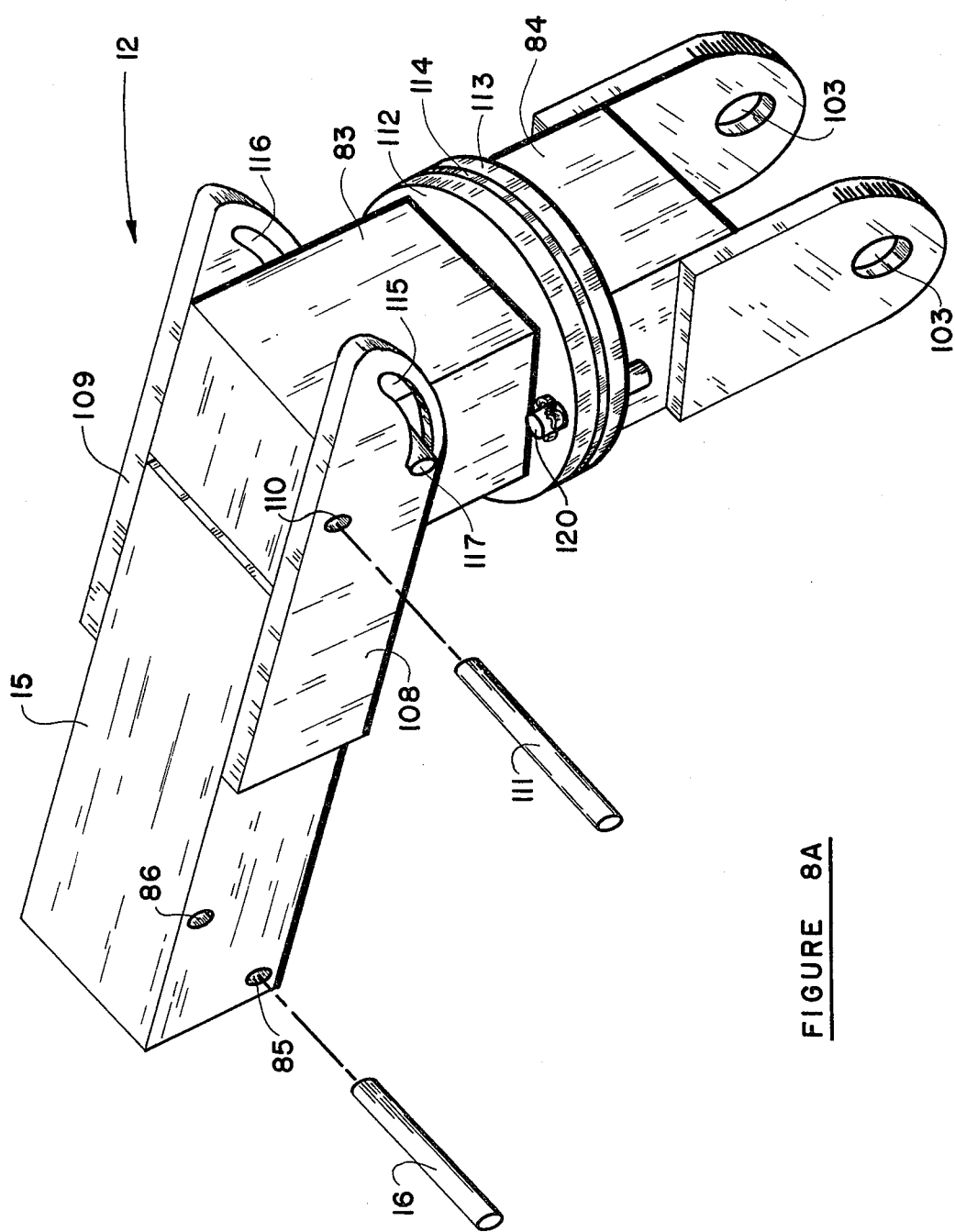
FIG. 8A is as three-dimensional view of an alternate preferred embodiment of the cutting deck attaching assembly.
Figure 9:
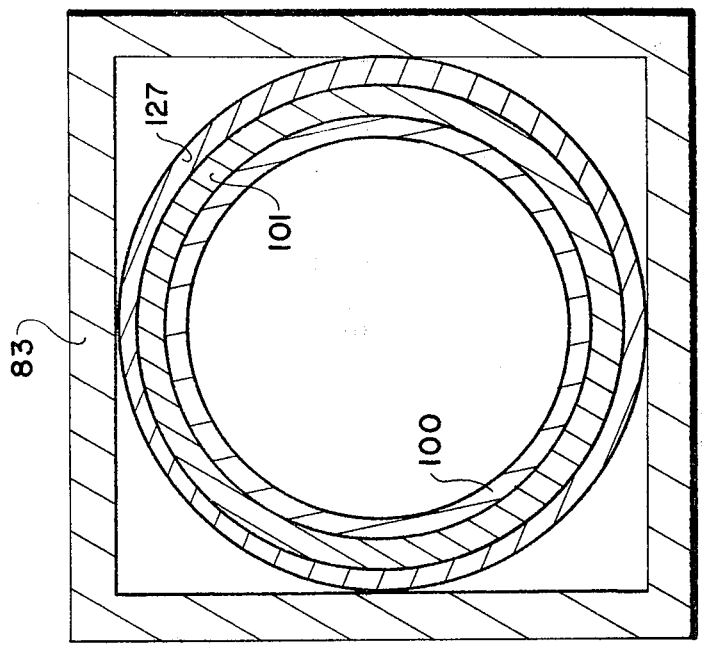
FIG. 9 is a cross-sectional view taken along lines III—III of FIG. 8.

In an alternate preferred embodiment of cutting deck attaching assembly 12, as shown in FIG. 8A, attaching member 15 is provided with parallel extension plates 108 and 109 having aligned openings 110 through which pivot pin 111 passes. Elbow section 83 is also provided with openings aligned with extension plate openings 110 so that elbow section 83 can be pivotly attached on pin 111 and between extension plates 108 and 109. In this embodiment, elbow section 83 and connector number 84 are provided with parallel flanges 112 and 113 between which is placed a self-lubricating spacer 114. Flanges 112 and 113 and spacer 114 are held in position relative to one another by cotter pins 120 or similar means as shown.

In this embodiment, plates 108 and 109 are provided at their extending end with aligned arcuate slots 115 and 116, respectively, through which positioning pin 117 passes to control the amount of pivoting of elbow section 83.

There are of course many alternate embodiments not specifically shown but which are intended to be included within the scope of this invention as defined by the following claims.

What I claim is:

1. A grass and ditch mower comprising:
(a) a telescoping boom assembly mounted at one end on a power driven movable carriage, said boom assembly comprising two concentric tubes positioned to telescope into a third tube, a first hydraulic cylinder attached to the outside of said third tube and the outer tube of said concentric tubes at its extending end, a second hydraulic cylinder attached at the end opposite said extending end of said outer tube and the adjacent end of the other concentric tube;
(b) a cutting deck assembly having an upper deck plate pivotly mounted to said other concentric tube of said boom assembly by a cutting deck attaching assembly; and
(c) means for attaching one end of said cutting deck attaching assembly to said upper deck plate so as to provide a floating deck assembly for closely following the contour of the surface being cut wherein said means is attached to parallel rods, the ends of which rest on springs held in position by a housing assembly.

* * * * *